(12) United States Patent
Hong et al.

(10) Patent No.: US 11,669,327 B2
(45) Date of Patent: Jun. 6, 2023

(54) COMPUTING DEVICE AND METHOD FOR LOADING DATA

(71) Applicant: Shanghai Biren Technology Co.,Ltd, Shanghai (CN)

(72) Inventors: Zhou Hong, Shanghai (CN); YuFei Zhang, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 84 days.

(21) Appl. No.: 17/523,833

(22) Filed: Nov. 10, 2021

(65) Prior Publication Data
US 2022/0147354 A1    May 12, 2022

(30) Foreign Application Priority Data
Nov. 12, 2020    (CN) .......................... 202011260055.8

(51) Int. Cl.
*G06F 9/30*      (2018.01)
*G06F 3/06*      (2006.01)
*G06F 9/38*      (2018.01)

(52) U.S. Cl.
CPC ........ *G06F 9/30043* (2013.01); *G06F 3/0604* (2013.01); *G06F 3/0655* (2013.01); *G06F 3/0673* (2013.01); *G06F 9/3836* (2013.01)

(58) Field of Classification Search
None
See application file for complete search history.

(56) References Cited

U.S. PATENT DOCUMENTS

2013/0125097 A1*   5/2013   Ebcioglu ............. G06F 12/0862
                                                                 717/136

* cited by examiner

*Primary Examiner* — Scott C Sun
(74) *Attorney, Agent, or Firm* — JCIP Global Inc.

(57) ABSTRACT

The embodiments of the disclosure relate to a computing device and a method for loading data. According to the method, the first processing unit sends a first instruction to the NMP unit. The first instruction includes a first address, a plurality of second addresses, and an operation type. In response to the first instruction, the NMP unit performs operations associated with the operation type on multiple data items on the multiple second addresses of the first memory, so as to generate the operation result. The NMP unit stores the operation result to the first address of the first memory. The first processing unit issues a flush instruction to make the operation result on the first address visible to the first processing unit. The first processing unit issues a read instruction to read the operation result on the first address to the first processing unit.

20 Claims, 4 Drawing Sheets

COMPUTING DEVICE AND METHOD FOR LOADING DATA

CROSS-REFERENCE TO RELATED APPLICATION

This application claims the priority benefit of China application serial no. 202011260055.8, filed on Nov. 12, 2020. The entirety of the above-mentioned patent application is hereby incorporated by reference herein and made a part of this specification.

BACKGROUND

Field of the Disclosure

The embodiments of the disclosure relate to the field of computer, and specifically relate to a computing device, a method for loading data, and a method for updating data.

Description of Related Art

Reading embedded tables has been widely applied in various ranges of computer applications, especially in artificial intelligence applications such as personalized recommendation models. For the deep learning recommendation model (DLRM), the sparse embedding operation represented by SparseLengthsSum (SLS) consists of the following two actions: first, a small amount of sparse lookup is performed in a huge embedded table, and then the embedded table entries are reduced by, for example, pooling.

Figure 1:
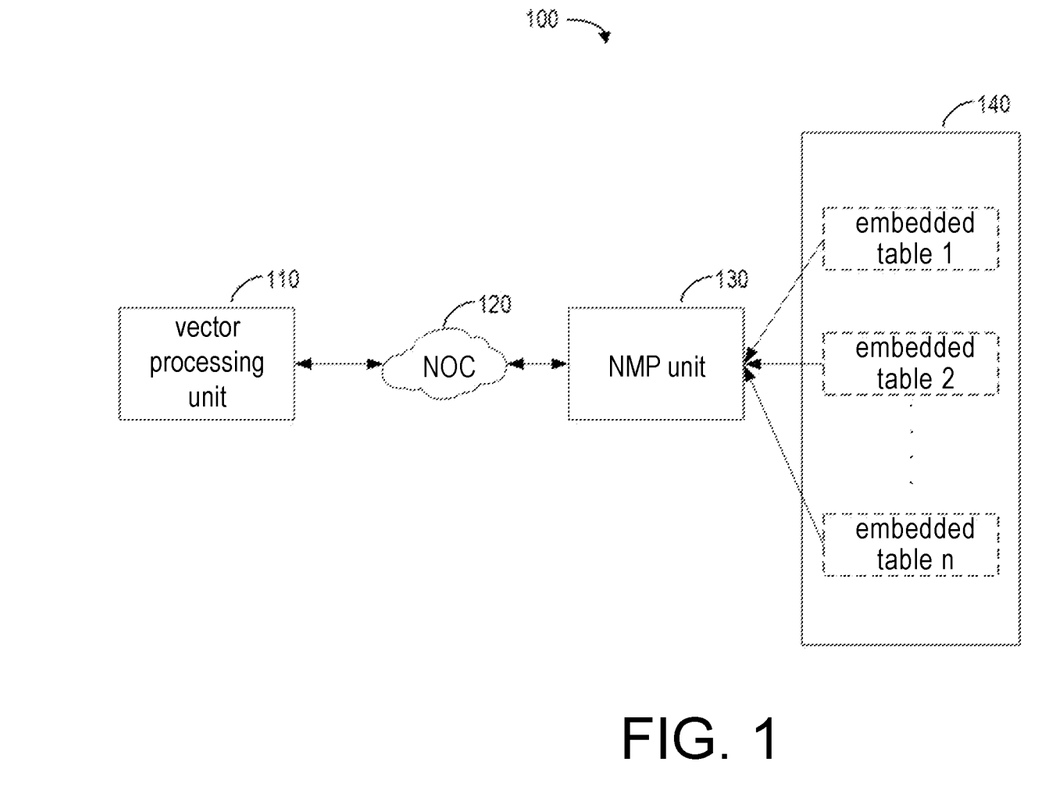
FIG. 1 is a schematic block diagram of an architecture 100 for near memory data processing in conventional technologies.

In conventional solutions, Near Memory Processing (NMP) is adopted to implement sparse embedding operations. Referring to FIG. 1, FIG. 1 shows a schematic block diagram of an architecture 100 for near memory data processing according to known technologies. As shown in FIG. 1, the architecture 100 includes a vector processing unit 110, an NMP unit 130, and a main memory 140 of a central processing unit (CPU). The vector processing unit 110 is connected to the NMP unit 130 and the main memory 140 through the NOC 120. The NMP unit 130 is coupled to the main memory 140. A plurality of embedded tables 1-n are stored in the main memory 140. The vector processing unit 110 initiates a sparse embedding operation on multiple embedded tables 1-n on the main memory 140. The NMP unit 130 performs a sparse embedding operation on multiple embedded tables 1-n, thereby improving the efficiency of the embedded table data search operation.

However, it is challenging to efficiently transfer the read data from the main memory 140 to the vector processing unit 110 through the NOC. In addition, there is a large amount of overhead for reading the entries to the vector processing unit 110 so that the weight gradient can be added to these entries. In the meantime, it is still a challenge to transmit write data through NOC.

SUMMARY OF THE DISCLOSURE

A computing device and a method for loading data are provided, which can flexibly process data in the NMP unit and efficiently read the operation result back to the first processing unit. In addition, another computing device and a method for updating data are provided, which can flexibly process data in the NMP unit and reduce the overhead for data movement in the data update process.

According to a first aspect of the disclosure, a computing device is provided. The computing device includes: a first processing unit; a first memory connected to the first processing unit through an NOC; and an NMP unit coupled to the first memory. The first processing unit is configured to send the first instruction to the NMP unit through NOC. The first instruction includes a first address, a plurality of second addresses, and an operation type. The first address and the plurality of second addresses are associated with the first memory. The NMP unit is configured to, in response to the first instruction, perform operations associated with the operation type on the plurality of data items on the plurality of second addresses of the first memory, so as to generate the operation result. Moreover, the NMP unit is further configured to store the operation result in the first address of the first memory. The first processing unit is further configured to issue a flush instruction for making the operation result on the first address visible to the first processing unit. Furthermore, the first processing unit is further configured to issue a read instruction for reading data from the first address to read the operation result on the first address to the first processing unit.

According to the second aspect of the disclosure, a method for loading data is provided. The method includes: a first processing unit sends a first instruction to an NMP unit through NOC. The first instruction includes a first address, a plurality of second addresses and an operation type. The first address and the plurality of second addresses are associated with a first memory. In response to the first instruction, the NMP unit performs operations associated with the operation type on multiple data items on the multiple second addresses of the first memory, so as to generate the operation result. The NMP unit stores the operation result to the first address of the first memory. The first processing unit issues a flush instruction to make the operation result on the first address visible to the first processing unit. The first processing unit issues a read instruction, which is used to read the operation result on the first address to the first processing unit.

According to the third party aspect of the disclosure, another computing device is provided. The computing device includes: a first processing unit; a first memory connected to the first processing unit through NOC; and an NMP unit coupled to the first memory. The first processing unit is configured to send a write instruction to the first memory through the NOC, and the write instruction includes a first address and a plurality of write data, so as to write the multiple write data into the first address of the first memory. The first processing unit is further configured to issue a flush instruction to make the multiple written data on the first address visible to the first processing unit. The first processing unit is further configured to send an update instruction to the NMP unit through the NOC, and the update instruction includes the first address and multiple second addresses. The plurality of second addresses are associated with the first memory. The NMP unit is further configured to, in response to the update instruction, perform a predetermined operation on a plurality of data items on the plurality of second addresses of the first memory and a plurality of write data on the first address, so as to generate a plurality of updated data items. The NMP unit is further configured to store the plurality of updated data items to a plurality of second addresses.

According to the fourth aspect of the disclosure, a method for updating data is provided. The method includes: a first processing unit sends a write instruction to a first memory through NOC. The write instruction includes a first address and a plurality of write data, so as to write the multiple write data to the first address of the first memory. The first processing unit issues a flush instruction to make the multiple write data on the first address visible to the first processing unit. The first processing unit sends an update instruction to the NMP unit through the NOC. The update instruction includes the first address and a plurality of second addresses, and the plurality of second addresses are associated with the first memory. In response to the update instruction, the NMP unit performs a predetermined operation on a plurality of data items on the plurality of second addresses of the first memory and a plurality of write data on the first address, so as to generate a plurality of updated data items. The NMP unit stores the plurality of updated data items to the plurality of second addresses.

It should be understood that the content described in this section is not intended to mark the key features or important features of the embodiments of the disclosure, nor is it intended to limit the scope of the disclosure. Other features of the disclosure will be easily comprehensible through the following description.

BRIEF DESCRIPTION OF THE DRAWINGS

The above and other features, advantages, and aspects of the embodiments of the disclosure will become more apparent in conjunction with the accompanying drawings and with reference to the following detailed description. In the drawings, the same or similar reference signs indicate the same or similar elements.

DESCRIPTION OF EMBODIMENTS

The following describes exemplary embodiments of the disclosure with reference to the accompanying drawings, which include various details of the embodiments of the disclosure to facilitate understanding, and should be regarded as merely exemplary. Therefore, those of ordinary skill in the art should understand that various changes and modifications can be made to the embodiments described herein without departing from the scope and spirit of the disclosure. Likewise, for clarity and conciseness, descriptions of commonly-known functions and structures are omitted from the following description.

The term "including" and its variants as used herein means open-ended inclusion, that is, "including but not limited to". Unless specifically stated, the term "or" means "and/or". The term "based on" means "based at least in part on." The terms "one exemplary embodiment" and "one embodiment" mean "at least one exemplary embodiment." The term "another embodiment" means "at least one additional embodiment." The terms "first", "second", etc. may refer to different or the same objects. The following may also involve other explicit and implicit definitions.

As stated above, it is challenging to efficiently transfer the read data from the main memory 140 to the vector processing unit 110 through the NOC. In addition, there is a large amount of overhead for reading the entries to the vector processing unit 110 so that the weight gradient can be added to these entries. In the meantime, it is still a challenge to transmit write data through NOC.

In order to solve at least one of the above-mentioned problems, the disclosure provides a computing device, a method for loading data, and a method for updating data.

Figure 2:
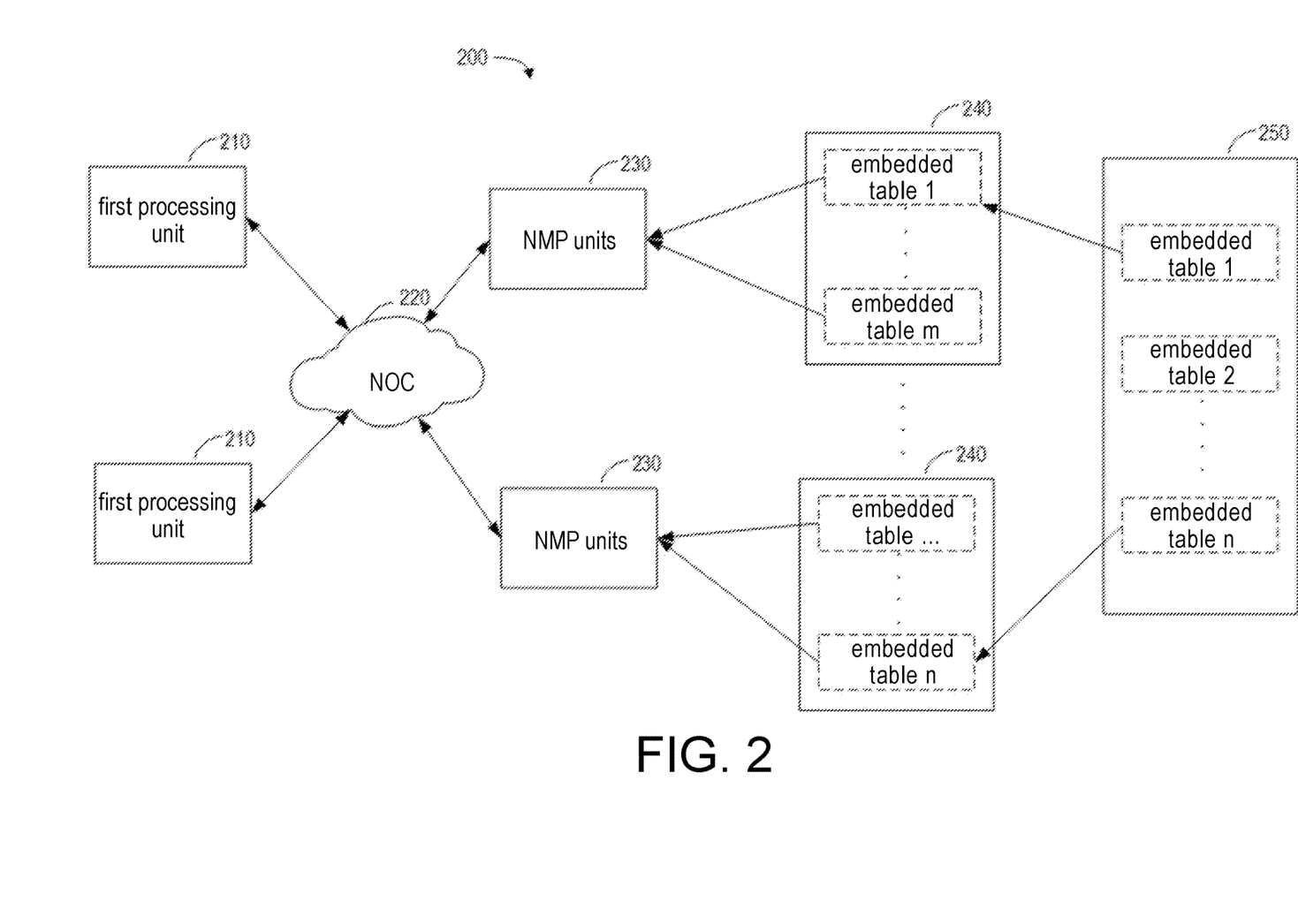
FIG. 2 is a schematic block diagram of a computing device 200 embodied in an embodiment of the disclosure.

FIG. 2 shows a schematic block diagram of a computing device 100 embodied in an embodiment of the disclosure. As shown in FIG. 2, the computing device 200 includes at least one first processing unit 210, an NOC 220, at least one NMP unit 230, at least one first memory 240 and a main memory 250. It should be understood that although FIG. 2 shows two first processing units 210, two NMP units 230, and two first memories 240, they are just exemplary. The number of the first processing unit 210, the NMP unit 230, and the first memory 240 may be more or less, and the disclosure provides no limitation thereto.

Regarding the first processing unit 210, it can be configured to process instructions for vectors and/or scalars. The first processing unit 210 includes, but is not limited to, for example, a vector processing unit, such as a vector processor, or a hardware circuit that implements a certain function, a special-purpose integrated circuit, and the like.

Regarding the NOC 220, it includes, but is not limited to, a bus connected between the first processing unit 210 and the first memory 240, for example. The bus bandwidth of the NOC includes, but is not limited to, 1024 bits and 2048 bits, for example.

Regarding the NMP unit 230, it is coupled to the first memory 240. The NMP unit 230 can receive instructions associated with the data in the first memory 240 from the first processing unit 210 through the NOC 220, and perform related operations on the data in the first memory 240 in response to the instructions.

Regarding the first memory 240, it is connected to the first processing unit 210 through the NOC 220. The first memory 240 includes, but is not limited to, dynamic random access memory (DRAM), and high bandwidth memory (HBM), for example. The first memory 240 serves as the local storage area of the first processing unit 210. The first memory 240 may store multiple data items, for example, including but not limited to multiple embedded tables, or multiple entries in the embedded table.

In some embodiments, the storage space occupied by the plurality of data items stored in the first memory 240 is less than or equal to the product of the length of the data item and the number of addresses corresponding to the length of the second address. For example, there are data elements with a fixed length in the entries in the embedded table, such as 32-bit floating point numbers. In this case, the storage space used for the embedded entry in the first memory 240 can be determined to be less than or equal to 16 GB, so that the physical address of the embedded entry can be expressed as 32 bits. Therefore, the range used for the embedded table in the first memory 240 enables the address pointing to the embedded table entry to be expressed more efficiently than the universal general 64-bit address.

Regarding the main memory 250, it may be associated with a CPU (not shown) and may be connected to the first processing unit 210 and the first memory 240 through, for example, PCIe. The main memory 250 includes, but is not limited to, DRAM, for example. The main memory 250 may store multiple data items, for example, including but not limited to multiple embedded tables 1-n.

Multiple data items, such as at least a part of the embedded tables in the embedded tables 1-n or multiple entries in the embedded tables, can be copied from the main memory 250 to the first memory 240 through direct memory access (DMA).

In some embodiments, the first processing unit 210 may be configured to send a first instruction to the NMP unit 230 through the NOC 220. The first instruction includes a first address, a plurality of second addresses, and an operation type, and the first address and the second address are associated with the first memory 240.

The lengths of the first address and the plurality of second addresses may be 32 bits, for example. The number of second addresses included in the first instruction can be determined based on the bandwidth of the NOC and the length of the second address. For example, the number of second addresses in the first instruction can be determined by dividing the bus bandwidth of the NOC by the length of the second address.

For example, when the bus bandwidth of the NOC 220 is 1024 bits and the length of the second address is 32 bits, it can be determined that 32 second addresses can be included in the first instruction. In another example, when the bus bandwidth of the NOC 220 is 2048 bits and the length of the second address is 64 bits, it can be determined that 32 second addresses can be included in the first instruction. Or, when the bus bandwidth of the NOC 220 is 2048 bits and the length of the second address is 32 bits, it can be determined that 64 second addresses can be included in the first instruction. As a result, the number of second addresses can fill the bus bandwidth of NOC, thereby achieving better bus utilization.

The NMP unit 230 may be configured to perform an operation associated with the operation type on the plurality of data items on the plurality of second addresses of the first memory 240 in response to the first instruction, so as to generate the operation result. The operation types include, but are not limited to, pooling and stitching.

Specifically, the NMP unit 230 may be configured to obtain a plurality of data items from the plurality of second addresses of the first memory 240 in response to the first instruction, and perform operations associated with the operation type on the plurality of obtained data items, so as to generate the operation result.

After generating the operation result, the NMP unit 230 may further be configured to store the operation result in the first address of the first memory 240.

The first processing unit 210 is further configured to issue a flush instruction to make the operation result at the first address visible to the first processing unit 210. For example, the first instruction may be cached or queued somewhere in the NOC, and issuing a flush instruction can enable the first instruction cached or queued somewhere in the NOC to be executed, thereby generating and storing the operation result at the first address.

The first processing unit 210 is further configured to issue a read instruction for reading the operation result on the first address to the first processing unit 210.

As a result, the address space allocated for operation results by each near memory unit can be used to flexibly process the data of one or more users. Then, because the cache in the NOC is efficiently filled with the NOC bus, the processed result can be efficiently read back to the first processing unit.

In some embodiments, the multiple second addresses in the first instruction may form a first sequence, such as A[0], A[1], . . . A[31]. The first instruction may also include a second sequence, and the second sequence is configured to indicate the number of multiple consecutive addresses associated with multiple users. For example, for m users, the number of consecutive addresses for each user is n[i], i=0, 1, . . . m−1.

The NMP unit 230 may also be configured to divide the first sequence into multiple address sets based on the second sequence.

The first sequence and the second sequence above are taken as examples. The first sequence can be divided into m address sets, including A[0]-A[n[0]−1], A[n[0]]-A[n[0]+n[1]−1], A[n[0]+n[1]]-A[n[0]+n[1]+n[2]−1], . . . A[n[0]+n[1]++n[2]+ . . . +n[m−1]]-A[31]. Specifically, taking m as 3 and the second sequence as 10, 15, and 7 as examples, the first sequence can be divided into 3 address sets, including A[0]-A[9], A[10]-A[24], and A[25]-A[31].

The NMP unit 230 can further be configured to perform operations associated with operation types respectively on multiple data sets on multiple address sets, so as to generate multiple operation results associated with multiple users. The data set in the multiple data sets includes at least one data item in a plurality of data items.

Take the following three address sets, namely A[0]-A[9], A[10]-A[24], and A[25]-A[31] and pooling operations as an example. 10 data items on A[0]-A[9] are added up to generate an operation result 1 of a user 1, 15 data items on A[10]-A[24] are added up to generate an operation result 2 of a user 2, and 7 data items on A[25]-A[31] are added up to generate an operation result 3 for a user 3.

The NMP unit 230 can further be configured to determine the multiple third addresses associated with multiple users based on the first address, the location of the number of multiple consecutive addresses associated with multiple users in the second sequence, and the length of the data item.

Specifically, the third address associated with the user may be equal to the first address+(the location of the number of consecutive addresses of the user in the second sequence*the length of the data item), for example. Take m as 3, the second sequence as 10, 15, and 7, and the length of the data item as 32 bits as an example. The location of the number 10 of consecutive addresses of the user 1 in the second sequence is 0, then the third address associated with the user 1 can be equal to the first address+(0*32 bits). The location of the number 15 of consecutive addresses of the user 2 in the second sequence is 1, then the third address associated with the user 2 can be equal to the first address+(1*32 bits). The location of the number 7 of consecutive addresses of the user 3 in the third sequence is 2, then the third address associated with the user 3 can be equal to the first address+(2*32 bits).

The NMP unit 230 may also be configured to store multiple operation results to multiple third addresses in the first memory.

Further to the example provided above, the operation result 1 can be stored at the first address+(0*the length of the data item), the operation result 2 can be stored at the first address+(1*the length of the data item), and the operation result 3 can be stored in the first address+(2*the length of the data item).

As a result, it is possible to realize data processing and result storage for multiple users for the first instructions associated with multiple users, which is convenient for reading results for multiple users. In the case that the data address of a single user is not enough to fill the bus bandwidth of NOC, by combining the data addresses of multiple users in the first instruction, the bus bandwidth can be filled and the bus utilization can be improved, so as to efficiently transfer the data back to the first processing unit.

Alternatively or additionally, in some embodiments, the first processing unit 210 may be configured to send a write instruction to the first memory 240 through the NOC 220. The write instruction includes the first address and multiple write data, and configured to write multiple write data into the first address of the first memory 240. The write data includes, but is not limited to, a weight gradient, for example, which is configured to be added to a corresponding entry, such as a weight.

For example, multiple write data can be written into the address space starting with the first address in the first memory 240. Taking 3 write data as an example, the first write data can be written into the first address, the second write data can be written into the address corresponding to the first address+the length of the data item, and the third write data can be written into the address corresponding to the first address+2*the length of the data item.

The first processing unit 210 may further be configured to issue a flush instruction for making multiple write data on the first address visible to the first processing unit 210. For example, a write instruction may be cached or queued somewhere in the NOC, and a flush instruction that is issued will enable the write instruction cached or queued in the NOC 220 to be executed, so that multiple write data are written to the first address of the first memory 240, and thus visible to the first processing unit 210.

The first processing unit 210 may further be configured to send an update instruction to the NMP unit 230 through the NOC 210, and the update instruction includes a first address and a plurality of second addresses. The update instruction is configured to instruct the NMP unit 230 to perform a predetermined operation on multiple data items on the first address and multiple data items on the multiple second addresses, and update the operation results to the multiple second addresses as the update results of the multiple data items. It should be understood that the number of multiple write data matches the number of multiple data items. In some embodiments, multiple second addresses are associated with one or more users.

The number of second addresses included in the update instruction can be determined based on the bandwidth of the NOC and the length of the second address. For example, the number of second addresses in the first instruction can be determined by dividing the bus bandwidth of the NOC by the length of the second address. Other descriptions of the first address and the second address can be derived from the above, so no further description is incorporated herein. Data items include, but are not limited to, embedded table entries, which are usually also referred to as weights.

The NMP unit 230 can further be configured to perform a predetermined operation on a plurality of data items on the plurality of second addresses of the first memory 240 and a plurality of write data on the first address, so as to generate a plurality of updated data items. The predetermined operations include, but are not limited to, addition and subtraction, for example.

Specifically, the NMP unit 230 may be configured to, in response to the update instruction, read multiple data items from multiple second addresses of the first memory 240, and read multiple write data from the first address of the first memory 240, and perform a predetermined operation respectively on multiple read data items and multiple write data, so as to generate multiple updated data items.

The NMP unit 230 may further be configured to store the multiple updated data items to multiple second addresses.

Thus, by performing predetermined operations such as addition on the data in the NMP unit, it is possible to avoid that the data such as table entries are extracted to the first processing unit such as a vector processor, thus significantly reducing the overhead for data movement. In addition, the address space allocated for intermediate write data by each near memory unit can be used to flexibly process the data of one or more users in one update. Transmitting a large piece of data through NOC at a time is also more efficient than transmitting a small piece of data multiple times through NOC.

Figure 3:
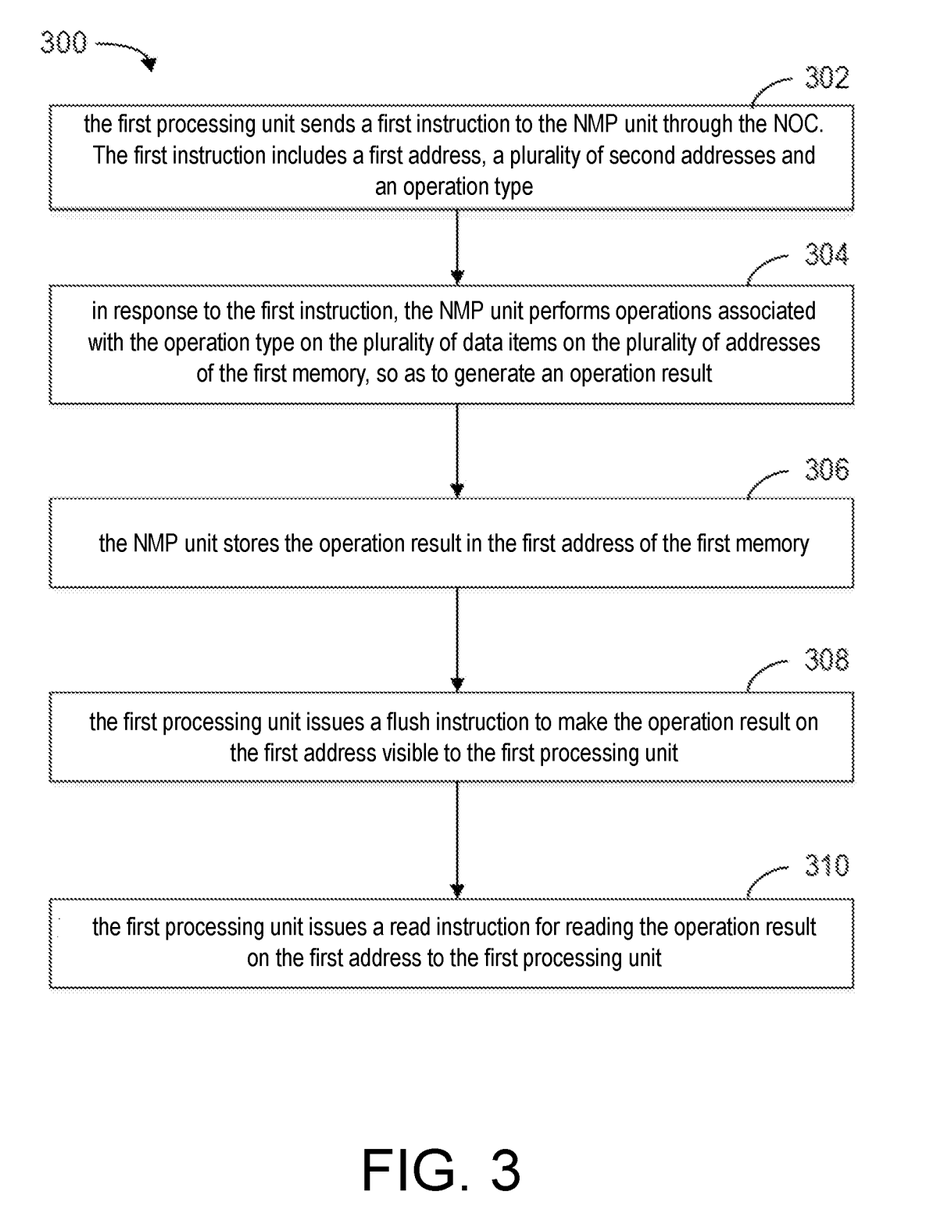
FIG. 3 is a schematic diagram of a method 300 for loading data embodied in an embodiment of the disclosure.

FIG. 3 shows a schematic diagram of a method 300 for loading data embodied in an embodiment of the disclosure. It should be understood that the method 300 may further include additional blocks that are not shown and/or the shown blocks may be omitted, and the disclosure provides no limitation thereto.

At block 302, the first processing unit 210 sends a first instruction to the NMP unit 230 through the NOC 220. The first instruction includes a first address, a plurality of second addresses and an operation type, and the first address and the plurality of second addresses are associated with the first memory 240.

At block 304, in response to the first instruction, the NMP unit 230 performs operations associated with the operation type on the plurality of data items on the plurality of second addresses of the first memory 240, so as to generate an operation result.

Specifically, the NMP unit 230 may, in response the first instruction, acquire multiple data items from multiple second addresses of the first memory 240, and then perform operations associated with the operation type on the multiple acquired data items, so as to generate the operation result.

At block 306, the NMP unit 230 stores the operation result in the first address of the first memory 240.

At block 308, the first processing unit 210 issues a flush instruction to make the operation result on the first address visible to the first processing unit 210.

At block 310, the first processing unit 210 issues a read instruction for reading the operation result on the first address to the first processing unit 210.

In this manner, the address space allocated for operation results by each near memory unit can be used to flexibly process the data of one or more users. Then, because the cache in the NOC is efficiently filled with the NOC bus, the processed result can be efficiently read back to the first processing unit.

In some embodiments, multiple second addresses in the first instruction may form a first sequence. The first instruction may further include a second sequence, and the second sequence is configured to indicate the number of multiple consecutive addresses associated with multiple users.

In this case, the NMP unit 230 may divide the first sequence into multiple address sets based on the second sequence.

The NMP unit 230 can perform operations associated with operation types respectively on multiple data sets on multiple address sets, so as to generate multiple operation results associated with multiple users. Each data set in the multiple data sets includes at least one data item in the multiple data items.

The NMP unit 230 can determine multiple third addresses associated with multiple users based on the first address, the location of the number of multiple consecutive addresses associated with multiple users in the second sequence, and the length of the data item.

The NMP unit 230 can store multiple operation results in multiple third addresses of the first memory 240.

The following shows an exemplary logic flow executed at the NMP unit 230 when the operation type is pooling.

```
idx = 0;
For(i=0; i<m; i++){
  result = 0;
  For(j=0; j<n[i]; j++){
    result += table[A[idx]];//read table entry from DRAM/HBM
    idx++;
  }
  Mem[addr+table_entry_size : addr] = result;// Store data to memory
  addr += table_entry_size;
}
```

In this manner, it is possible to realize data processing and result storage for multiple users for the first instructions associated with multiple users, which is convenient for reading results for multiple users. In the case that the data address of a single user is not enough to fill the bus bandwidth of NOC, by combining the data addresses of multiple users in the first instruction, the bus bandwidth can be filled and the bus utilization can be improved, so as to efficiently transfer the data back to the first processing unit.

Figure 4:
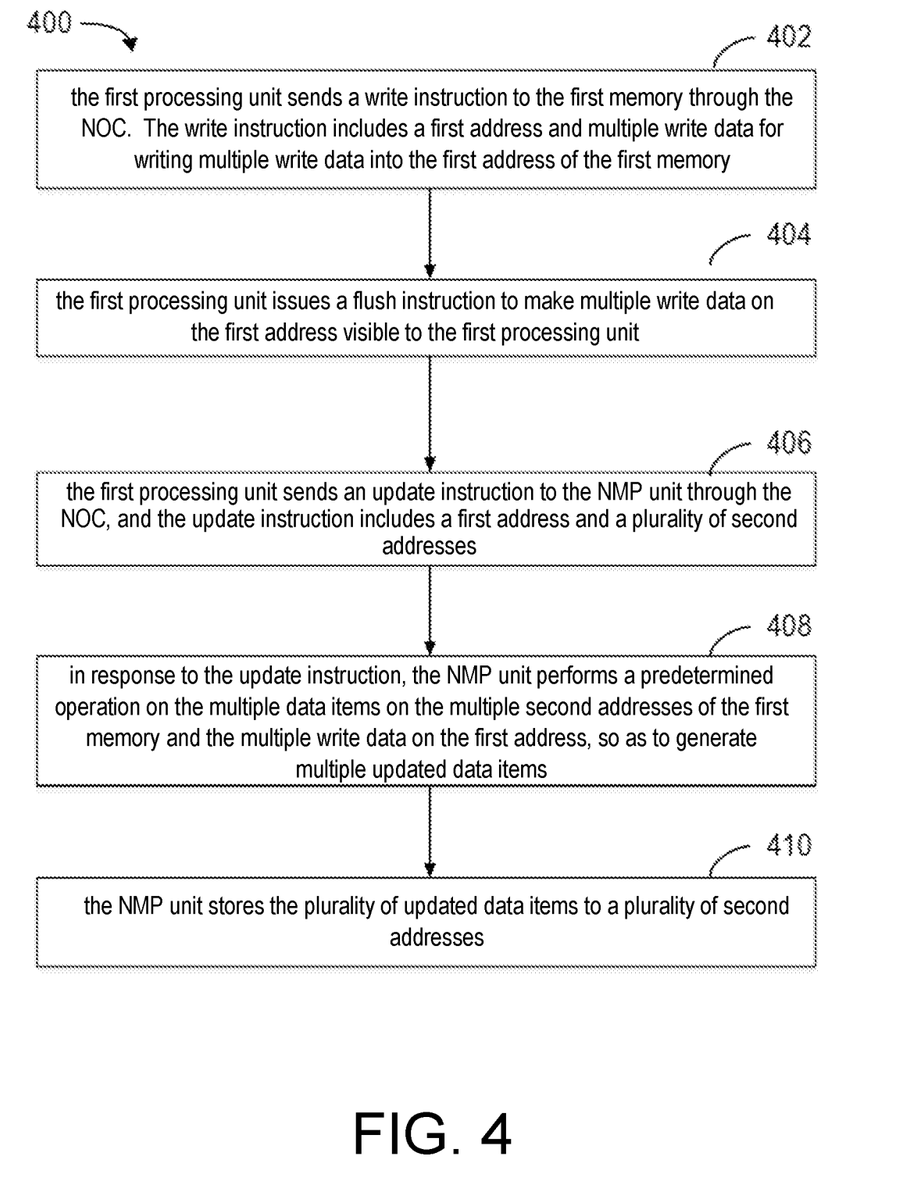
FIG. 4 is a schematic diagram of a method 400 for updating data embodied in an embodiment of the disclosure.

FIG. 4 shows a schematic diagram of a method 400 for updating data embodied in an embodiment of the disclosure. It should be understood that the method 400 may further include additional blocks that are not shown and/or the shown blocks may be omitted, and disclosure provides no limitation thereto.

At block 402, the first processing unit 210 sends a write instruction to the first memory 240 through the NOC 220. The write instruction includes a first address and multiple write data for writing multiple write data into the first address of the first memory 240.

At block 404, the first processing unit 210 issues a flush instruction to make multiple write data on the first address visible to the first processing unit 210.

At block 406, the first processing unit 210 sends an update instruction to the NMP unit 230 through the NOC 220, and the update instruction includes a first address and a plurality of second addresses.

At block 408, in response to the update instruction, the NMP unit 230 performs a predetermined operation on the multiple data items on the multiple second addresses of the first memory and the multiple write data on the first address, so as to generate multiple updated data items.

At block 410, the NMP unit 230 stores the plurality of updated data items to a plurality of second addresses.

The following shows an exemplary logic flow executed at the NMP unit 230 when the predetermined operation is addition.

```
idx = 0;
For(i=0; i<m; i++){
  result = 0;
  For(j=0; j<n[i]; j++){
    result = table[A[idx]] + Mem[addr+table_entry_size : addr];
    table[A[idx]] = result;
    addr += table_entry_size;
    idx++;
  }
}
```

Thus, by performing predetermined operations such as addition on the data in the NMP unit, it is possible to avoid that the data such as table entries are extracted to the first processing unit such as a vector processor, thus significantly reducing the overhead for data movement. In addition, the address space allocated for intermediate write data by each near memory unit can be used to flexibly process the data of one or more users in one update. Transmitting a large piece of data through NOC at a time is also more efficient than transmitting a small piece of data multiple times through NOC.

Those skilled in the art can understand that the steps of method described here are not limited to the order shown exemplarily in the drawings, but can be executed in any other order feasible.

The above description of the disclosure is intended to enable any person of ordinary skill in the art to implement or use the disclosure. Various modifications of the disclosure are obvious to those of ordinary skill in the art, and the general principles defined herein can also be applied to other modifications without departing from the spirit and scope to be protected by the disclosure. Therefore, the disclosure is not limited to the examples and designs described herein, but is consistent with the broadest scope of the principles and novel features disclosed herein.

What is claimed is:

1. A method for loading data, comprising the following steps:
   sending, by a first processing unit, a first instruction to a near memory processing (NMP) unit through a network on chip (NOC), wherein the first instruction comprises a first address, a plurality of second addresses and an operation type, and the first address and the plurality of second addresses are associated with a first memory;
   in response to the first instruction, performing, by the NMP unit, operations associated with the operation type on a plurality of data items on the plurality of second addresses of the first memory, so as to generate an operation result;
   storing, by the NMP unit, the operation result to the first address of the first memory;
   issuing, by the first processing unit, a flush instruction to make the operation result on the first address visible to the first processing unit; and
   issuing, by the first processing unit, a read instruction to read the operation result on the first address to the first processing unit.

2. The method according to claim 1, wherein the step of performing, by the NMP unit, the operations associated with the operation type on the plurality of data items on the plurality of second addresses of the first memory comprises:
   dividing a first sequence formed by the plurality of second addresses into a plurality of address sets based on a second sequence, wherein the second sequence is comprised in the first instruction and is used to indicate the number of a plurality of consecutive addresses associated with a plurality of users; and
   performing operations associated with the operation type respectively on a plurality of data sets on the plurality of address sets, so as to generate a plurality of operation results associated with the plurality of users, wherein each of the data sets in the plurality of data sets comprises at least one data item in the plurality of data items.

3. The method according to claim 2, wherein the step of storing, by the NMP unit, the operation result to the first address of the first memory comprises:
   determining a plurality of third addresses associated with the plurality of users based on the first address, a location of the number of the plurality of consecutive addresses in the second sequence, and a length of the data item; and storing the plurality of operation results into the plurality of third addresses of the first memory.

4. The method according to claim 1, wherein the plurality of data items are copied from a main memory to the plurality of second addresses through direct memory access.

5. The method according to claim 1, wherein the number of the second address is determined based on a bandwidth of the NOC and a length of the second address.

6. The method according to claim 1, wherein lengths of the first address and the plurality of second addresses are 32 bits.

7. The method according to claim 1, wherein the first processing unit comprises a vector processing unit.

8. The method according to claim 1, wherein a storage space occupied by the plurality of data items is less than or equal to a product of a length of the data item and the number of addresses corresponding to a length of the second address.

9. The method according to claim 1, wherein the plurality of data items comprises a plurality of embedded table entries.

10. The method according to claim 9, wherein the operation type comprises pooling or stitching.

11. A computing device, comprising:
a first processing unit;
a first memory, connected to the first processing unit through an NOC; and
an NMP unit, coupled to the first memory,
wherein the first processing unit is configured to send a first instruction to the NMP unit through the NOC, the first instruction comprises a first address, a plurality of second addresses, and an operation type, the first address and the plurality of second addresses are associated with the first memory,
the NMP unit is configured to, in response to the first instruction, perform operations associated with the operation type on a plurality of data items on the plurality of second addresses of the first memory, so as to generate an operation result,
the NMP unit is further configured to store the operation result in the first address of the first memory,
the first processing unit is further configured to issue a flush instruction for making the operation result on the first address visible to the first processing unit,
the first processing unit is further configured to issue a read instruction for reading the operation result on the first address to the first processing unit.

12. The computing device according to claim 11, wherein the NMP unit is further configured to perform the following steps:

dividing a first sequence formed by the plurality of second addresses into a plurality of address sets based on a second sequence, wherein the second sequence is comprised in the first instruction and is used to indicate the number of a plurality of consecutive addresses associated with a plurality of users; and performing operations associated with the operation type respectively on a plurality of data sets on the plurality of address sets, so as to generate a plurality of operation results associated with the plurality of users, wherein each of the data sets in the plurality of data sets comprises at least one data item in the plurality of data items.

13. The computing device according to claim 12, wherein the NMP unit is further configured to perform the following steps:

determining a plurality of third addresses associated with the plurality of users based on the first address, a location of the number of the plurality of consecutive addresses in the second sequence, and a length of the data item; and storing the plurality of operation results into the plurality of third addresses of the first memory.

14. The computing device according to claim 11, wherein the first memory is coupled to a main memory, and the plurality of data items are copied from the main memory to the plurality of second addresses through direct memory access.

15. The computing device according to claim 11, wherein the number of the second address is determined based on a bandwidth of the NOC and a length of the second address.

16. The computing device according to claim 11, wherein lengths of the first address and the plurality of second addresses are 32 bits.

17. The computing device according to claim 11, wherein the first processing unit comprises a vector processing unit.

18. The computing device according to claim 11, wherein a storage space occupied by the plurality of data items is less than or equal to a product of a length of the data item and the number of addresses corresponding to a length of the second address.

19. The computing device according to claim 11, wherein the plurality of data items comprises a plurality of embedded table entries.

20. The computing device according to claim 19, wherein the operation type comprises pooling or stitching.

* * * * *